Dec. 18, 1962 H. W. ENGELMAN 3,068,701
PRESSURE RATIO SENSOR
Filed Sept. 16, 1959 2 Sheets-Sheet 1
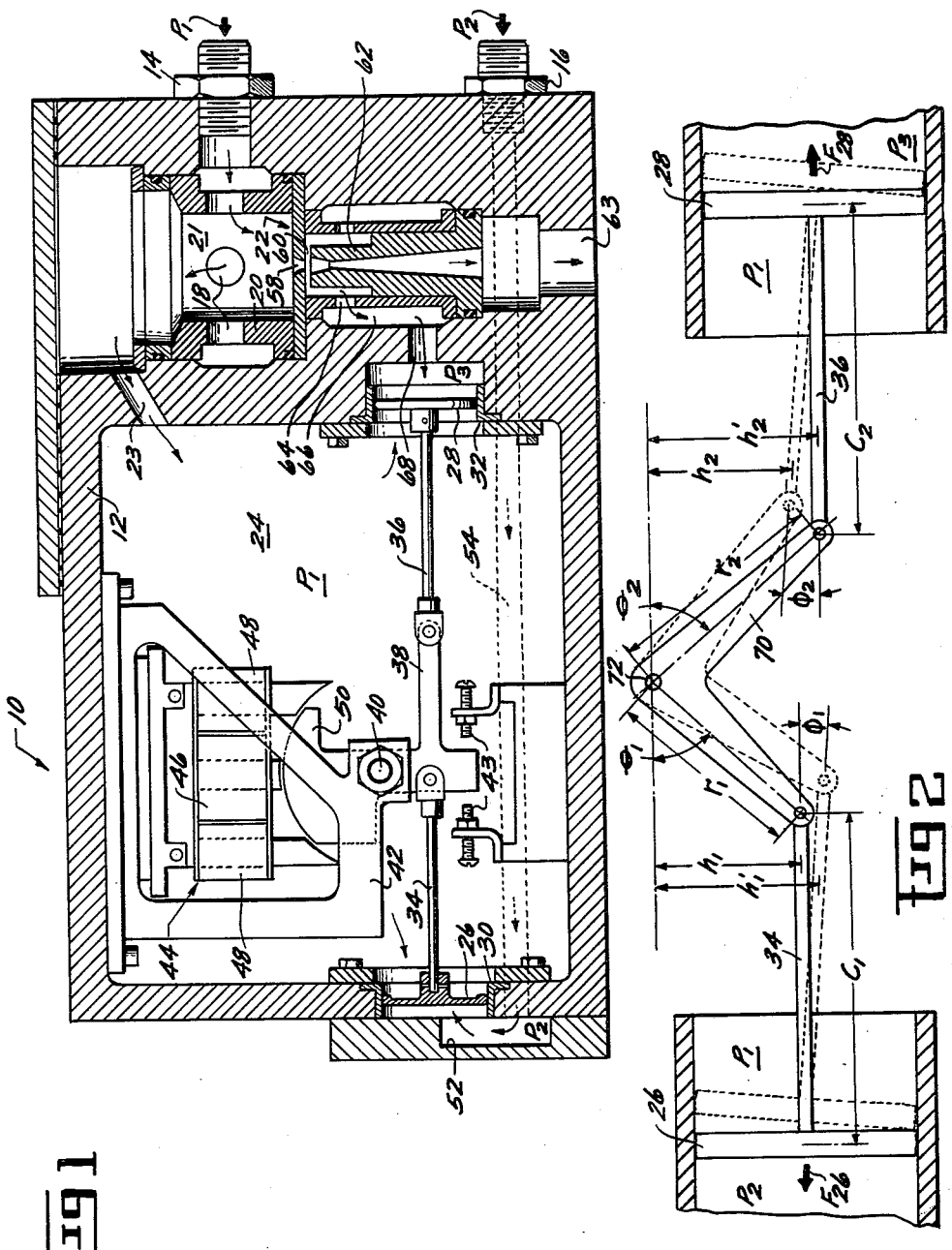
INVENTOR.
HELMUTH W. ENGELMAN
BY Carl Baker
ATTORNEY

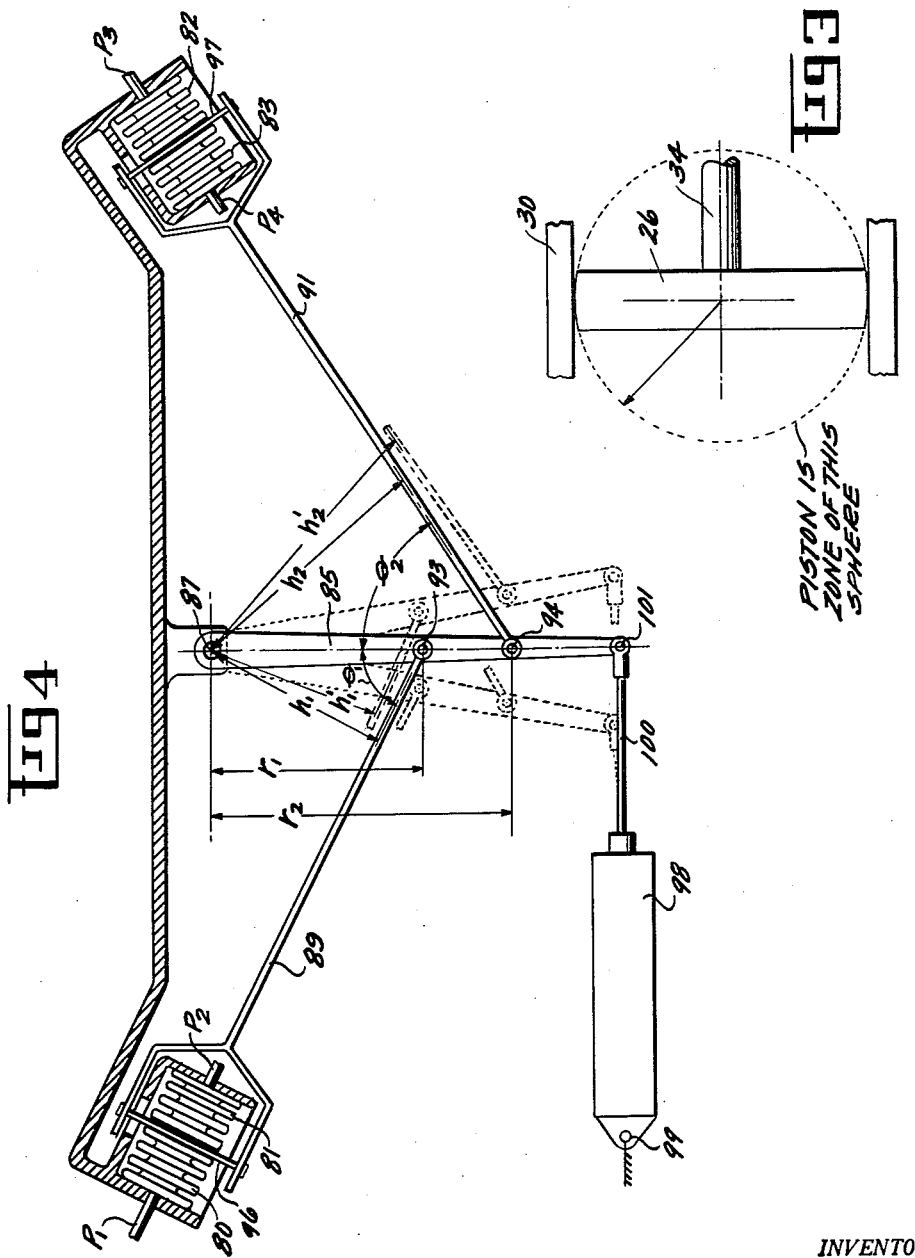

United States Patent Office 3,068,701
Patented Dec. 18, 1962

3,068,701
PRESSURE RATIO SENSOR
Helmuth W. Engelman, Cincinnati, Ohio, assignor to General Electric Company, a corporation of New York
Filed Sept. 16, 1959, Ser. No. 840,430
6 Claims. (Cl. 73—407)

This invention relates generally to differential pressure apparatus and more specifically is directed to apparatus of this type responsive to two or more fluid pressures to provide indication or control of ratios between the pressures Pressure ratio sensing devices as conventionally constructed comprise a number of diaphragms or other pressure responsive elements the force outputs of which are balanced against each other through linkage mechanism including a variable lever arm adjustable to maintain balance between the opposed forces. The necessary adjustment of this variable lever arm is commonly obtained by moving the fulcrum point of the arm, with fulcrum movement being effected by some form of servomechanism arranged to be operative in response to unbalance of forces on the lever arm. This servomechanism adds significantly to the mechanical complexity of the system, particularly in view of the necessity to provide appropriate power supply means for the servo. Moreover, frictional forces in instruments of this type are characteristically high, seriously detracting from sensitivity of the instrument and from accuracy of its measurement.

The present invention has as a primary object the provision of new and improved differential pressure apparatus which obviates these and other shortcomings of prior such apparatus. A further object of the invention is the provision of apparatus of this type affording mechanical simplicity and consequent reliability of operation, and at the same time affording good accuracy, sensitivity and speed of response.

It is also an object of the invention to provide novel apparatus for sensing ratios of two or more fluid pressures wherein the pressure responsive elements have their force outputs balanced against each other through variable mechanical advantage means which are self-adjusting without servo aid to provide a force multiplication ratio varying as necessary to maintain force balance. Another object is the provision of such apparatus wherein fulcrum means interconnect the pressure derived forces in opposing relation through force moment arms proportioned to enable force balance at a predetermined value of pressure ratio, with the fulcrum means being self-adjusting in response to pressure ratio departures from this value to change the relative lengths of the force moment arms in a direction to restore force balance.

Briefly stated, in accordance with one aspect of the invention the servomechanism conventionally used in prior pressure ratio sensors is eliminated by interposition of self-variable mechanical advantage means between the pressure derived forces, with balance between these forces being maintaind by self-adjustment of the variable mechanical advantage means due to its movement in response to force unbalance. In practice the variable mechanical advantage means preferably takes the form of a fulcrum member pivoted for angular movement about an axis, with the pressure responsive elements being connected to apply their pressure derived forces to this fulcrum member through moment arms so arranged that movement of the fulcrum member in response to force unbalance causes a change in relative lengths of the moment arms in a direction to restore force balance. Position of the fulcrum member, or other element which moves with it, then provides an accurate measure of pressure ratio.

The invention will itself be further understood and its various objects features and advantages more fully appreciated by reference to the appended claims and the following detailed description when read in conjunction with the accompanying drawings, wherein:

FIGURE 1 is a part sectional view of one embodiment of differential pressure apparatus in accordance with the invention;

FIGURE 2 is a schematic illustrating certain principles of operation of the apparatus of FIGURE 1;

FIGURE 3 is an enlarged detail view showing configuration of the piston elements of FIGURES 1 and 2; and FIGURE 4 is a part sectional view of another illustrative embodiment of the invention.

With continued reference to the drawings, wherein like reference numerals have been used throughout to designate like elements, FIGURE 1 illustrates the invention as embodied in apparatus for sensing the ratio of two pressure differences. As will later be explained, however, the invention also comprehends measurement of other pressure relationships including ratios between absolute pressures.

The differential pressure apparatus designated generally by reference numeral 10 in FIGURE 1 includes a housing 12 provided with inlet fittings 14 and 16 each adapted to be connected to one of the two pressures $P_1$ and $P_2$ the ratio between which is to be measured. Inlet fitting 14 connects through radial bores 18 formed in a sleeve member 20 which, together with adjacent walls of housing 12, defines a small plenum chamber 21 from which a reference pressure generator 22 to be later described is supplied with energizing fluid. This chamber 21 also is open through a bore 23 to chamber 24 within the main body of housing 12, to thus subject the chamber 24 to pressure $P_1$ in operation of the apparatus.

Within chamber 24 is disposed a pair of pressure responsive elements which in the embodiment illustrated take the form of piston members 26 and 28 slidable within cylinders 30 and 32, respectively, formed in the walls of housing 12 or in liners inserted therein as shown. The pistons 26 and 28 are coupled through connecting rod members 34 and 36, respectively, to a crank or fulcrum member 38 mounted for limited angular rotation about a pivot 40. As illustrated, this pivot 40 may take the form of a pin having its opposite ends journaled in bracket members 42 mounted to housing 12 within chamber 24, with the fulcrum member 38 being freely rotatable on pivot 40 so as to constitute, together with pistons 26—28 and connecting members 34—36, a rocker assembly free for angular movement about the axis of pivot 40. Preferably, adjusting stop means 43 are provided for limiting the extremes of motion of the rocker assembly.

Any suitable position sensor may be utilized for sensing rocker assembly movement and indicating position, with the position sensor arranged to be responsive either to linear movement of one of the pistons 26—28 or angular movement of the fulcrum member. As shown, an electrical transducer 44 of differential transformer type is employed having an A.C.-excited primary coil 46 and two secondary coils 48 which supply an output signal indicative of the angular position of the iron pole piece 50 carried by the rocker assembly for rotation therewith.

As previously noted, chamber 24 within the main body of housing 12 is subjected to pressure $P_1$ and this pressure acts on the inner faces of both pistons 26 and 28 tending to move the pistons outwardly. The outer face of one piston 26 is exposed directly to the other of the two inlet pressures $P_2$, through passages 52 and 54 formed in housing 12 and connecting with the inlet fitting 16.

The outer face of the other piston 28 is subjected to a third pressure $P_3$ which is supplied by reference pressure generator 22. This generator is of choked nozzle type and includes an inlet orifice 58 defining a convergent nozzle element which discharges through a gap 60 into a second nozzle element 62 of convergent-divergent form connected to discharge through passage 63 to atmosphere. A pressure tap-off through gap 60 between the nozzle elements 58 and 62 connects the reference pressure $P_3$ through passages 66 and 68 to the outer face of piston 28.

The nozzle structure just described preferably is operated under conditions such that flow through it is choked, thus assuring that the generated pressure $P_3$ bears some constant fractional relationship to the higher pressure $P_1$; that is, $P_3 = kP_1$ where $k$ is a constant typically of the order of 0.75. This proportionality of $P_3$ to $P_1$ is desirable because, as mentioned previously, the apparatus described operates to measure the ratio of two pressure differences, namely the ratio:

$$\frac{P_1-P_2}{P_1-P_3}$$

and generally it will be preferred that this ratio include only two independent variables, with $P_3$ being a simple function of one of the other two variables. Use of a choked nozzle provides this desired proportionality.

Since the pressure $P_3$ always is some fraction of $P_1$, the net force on piston 28 obviously must be an outwardly directed one. To balance against such outwardly directed force on piston 28 it is apparent that the net pressure derived force on piston 26 must be similarly directed, which with the simple piston structure shown reqires that $P_1$ always be higher than $P_2$. Where $P_1$ and $P_2$ are not so related, other arrangements in accordance with the invention may be resorted to as hereinafter explained.

The principle of operation of the apparatus of FIGURE 1 may best be understood by reference to FIGURE 2, which illustrates graphically the action of the pressure derived forces within simplified apparatus corresponding in basic arrangement to FIGURE 1. In FIGURE 2 the crank or fulcrum member 38 of FIGURE 1 has been shown as a bellcrank 70 mounted for rotatation about a pivot 72, which corresponds in function to the pivot 40 in FIGURE 1. The pressure difference across piston 26, which equals $P_1-P_2$, gives rise to an outwardly directed force on piston 26 proportional to that pressure difference and to the area $A_{26}$ of the piston. Similarly, there is an outwardly directed force on piston 28 proportional to the pressure difference $P_1-P_3$ and proportional also to the area $A_{28}$ of the piston 28. These opposed forces are balanced against each other by bellcrank 70, which constitutes mechanical advantage means providing force multiplication between the two opposed forces.

The various components of the system are proportioned so as to obtain balance between these outwardly directed forces with the pistons and bellcrank arranged as shown in solid lines in FIGURE 2, when the pressure ratio sensed is at an initial or design value. When the pressure ratio departs from this value, the force balance is disturbed and the pistons and bellcrank move to another position such as shown for example in dotted lines in FIGURE 2. It will be noted that with the parts in this latter position, the effective moment arm of piston 26 has increased from $h_1$ to $h'_1$, whereas in the case of piston 28 the moment arm has shortened from $h_2$ to $h'_2$. Under these conditions, a smaller pressure difference across piston 26 and correspondingly smaller outward force on that piston can balance against a larger pressure difference and outward force on piston 28 than was the case when the parts were in their initial position.

It will be apparent, then, that the structures of FIGURES 1 and 2 are so arranged that in response to a force unbalance, the rocker assembly moves through an angle of magnitude related to the degree of departure of the pressure ratio from the initial or normal value, and that this movement is effective to cause self-adjustment of the force moment arms and thus of the force multiplication factor afforded by the rocker assembly, in a direction and to the extent necessary to so adjust the force moment arms as to rebalance the opposed forces and restore equilibrium. Thus, the rocker assembly constitutes variable mechanical advantage means through which the opposed pressure derived forces are balanced, and the assembly is self-adjusting to always maintain balance between these opposed forces without necessity for servomechanism or complex structure for detecting and maintaining such balance.

The mathematical relationship between the pressure ratio sensed and angular position of the rocker assembly may readily be derived. Thus, from FIGURE 2 it is believed apparent that the pressure derived forces $F_{26}$ and $F_{28}$ on pistons 26 and 28, respectively, are as follows:

$$F_{26} = A_{26}(P_1-P_2)$$
$$F_{28} = A_{28}(P_1-P_3)$$

where $A_{26}$ and $A_{28}$ are the areas of pistons 26 and 28, respectively.

However, when the pistons are canted slightly from the vertical position to positions as shown in dotted lines in FIGURE 2, for example, correction must then be introduced in order to obtain the net or resultant force on the piston rod. When this is done, the forces $F'$ on the rods become:

$$F'_{26} = A_{26}(P_1-P_2) \sec \phi_1$$
$$F'_{28} = A_{28}(P_1-P_3) \sec \phi_2$$

where $\phi_1$ and $\phi_2$ are the angles through which the piston rods 34 and 36 are canted (see FIG. 2).

These forces act through moment arms $h_1$ and $h_2$ of length dependent on the position of bellcrank 70, to give force moments as follows:

$$FM_{26} = F'_{26} r_1 \sin (\phi_1 + \theta_1)$$
$$FM_{28} = F'_{28} r_2 \sin (\phi_2 + \theta_2)$$

and, since the system must balance, the two force moments may be equated to give:

$$F'_{26} r_1 \sin (\phi_1 + \theta_1) = F'_{28} r_2 \sin (\phi_2 + \theta_2)$$

Substituting in the expressions for $F'_{26}$ and $F'_{28}$, this equation becomes:

$$\frac{P_1-P_2}{P_1-P_3} = \frac{A_{28}}{A_{26}} \frac{r_2}{r_1} \frac{\sin (\phi_2+\theta_2) \cos \phi_1}{\sin (\phi_1+\theta_1) \cos \phi_2}$$

where:

$$\phi = \arc \sin \frac{r_1 \sin \theta_1 - h_1}{c_1}$$

$$\phi = \arc \sin \frac{r_2 \sin \theta_2 - h_2}{c_2}$$

It will be noted that while the resulting expression for the pressure ratio is complex, still the only independent variables remaining are $\theta_1$ and $\theta_2$ and since the relationship between these is fixed, actually there is but a single variable and all the other parameters which enter into the equation are constants or direct functions of this one variable. Thus, pressure ratio indication is seen to be a function of a single variable, namely the angular position of the rocker assembly, so that measurement of rocker assembly position by any suitable pick-off means provides an accurate indication of pressure ratio.

The output will not be linear in the case just described, but is is readily possible to correct the indication obtained for this nonlinearity. Correction is further simplified if the piston rods are made sufficiently long that piston movement does not cause the piston rods to depart significantly from their initial parallel position; i.e., the angles $\phi_1$ and $\phi_2$ remain so small that their value is approximately zero and their cosine accordingly is approximately equal to unity. Under these conditions, the expression for pressure ratio simplifies to:

$$\frac{P_1-P_2}{P_1-P_3}=\frac{A_{28}}{A_{26}}\frac{r_2 \sin \theta_2}{r_1 \sin \theta_1}$$

Also, if the angle between the two arms of the bellcrank is made a right angle, this leads to further simplification of this expression, to the following:

$$\frac{P_1-P_2}{P_1-P_3}=\frac{A_{28}}{A_{26}}\frac{r_2}{r_1} \tan \theta_1$$

Even in these latter cases, the output indication provided by angular movement of the rocker assembly is a trigonometric rather than a linear function of pressure ratio. However, it is a relatively simple matter to compensate for this to obtain linearity of the final read-out signal. Such compensation may be provided either by designing complementary nonlinearity into the read-out transducer or by appropriate conversion of read-out indications of a linear transducer.

As previously noted, the arrangement of FIGURE 1 includes a choked nozzle constituting a reference pressure generator operative in a manner such that the pressure $P_3$ produced is a direct and simple function of the supply pressure $P_1$, in accordance with the relation: $P_3=kP_1$. The equation for output of the sensor accordingly may be simplified as follows:

$$\frac{P_2}{P_1}=(k-1)\frac{A_2 \cdot r_2 \sin (\phi_2+\theta_2) \cos \phi_1}{A_{26}r_1 \sin (\phi_1+\theta_1) \cos \phi_2}+1$$

Referring now to FIGURE 3, which is an enlarged detail view of one of the pistons 26 or 28 of FIGURES 1 and 2, the piston is shown with its peripheral surface of configuration such that in section it constitutes a circular arc segment with its center located on the piston centerline. In other words, the peripheral portion of each piston is in the form of a zone of a sphere centered on the piston axis. This permits canting of the pistons within the cylinders to inclined positions as shown in FIGURE 2 and thus obviates the need for pivoted connection between the pistons and connecting rods. This arrangement is also of advantage in that it permits only line contact between the piston and cylinder wall, which significantly reduces friction between the piston and cylinder.

Normally it is not feasible to interfit pistons and cylinders in constructions of this type with sufficient precision to stop all leakage across the piston. In applications wherein such leakage is permissible, however, as is often the case where pressure ratios are being measured, the leakage has been found to give the pistons a floating or centralizing action which is beneficial to freer movement of the parts with respect to each other.

In applications wherein leakage is undesirable, conventional piston and cylinder construction may be substituted. If such substitution should result in sticking of parts due to friction, this might be remedied by introducing dither either through the read-out transducer or by independent mechanism. Diaphragm or bellows assemblies, which permit no leakage, might also be substituted for piston and cylinder type elements, as will be discussed hereinafter in connection with FIGURE 4.

It will be understood that the relative sizes of the pistons 26 and 28 may be varied to obtain desired output indication for any given pressure ratio. Adjustment to this same end may alternatively be effected by modifying the relative lengths of the crank arms $r_1$ and $r_2$ provided by the fulcrum member, or by change of the crank angles $\theta_1$ and $\theta_2$. It is also possible to arrange the rocker assembly in a manner such that the piston rods are not nominally collinear as viewed in at least one plane as in the embodiment illustrated in FIGURE 1, thus introducing an additional degree of flexibility.

Thus, changes in the pressure ratio ranges which can be handled by the devices of this invention may easily be effected in any of several different ways. These devices accordingly offer the advantage of extreme flexibility of application, the same basic housing and other hardware being readily adapted to different applications merely by substitution of appropriate piston and cylinder assemblies or rocker arm configurations.

The structure of FIGURE 1 also affords significant advantages in its obvious simplicity of construction and consequent adaptability to design for reliability. A further advantage is that the speed of response of the system varies directly with pressure level, being actually proportional to the square root of the pressure level, and response characteristics of this type are very desirable in many applications. The circular section rims on the two pistons 26 and 28, and the resulting line contact between piston and cylinder, minimize friction in the system, and the fluid leakage around the pistons normally experienced with this arrangement has been found to be of significant advantage in causing a floating or centralizing action further tending to reduce piston-cylinder friction. It will be noted also that since the structure of FIGURE 1 incorporates no springs, accuracy of measurement is not dependent on spring constants and the instrument accordingly is relatively insensitive to temperature change and other effects which commonly detract from accuracy of spring-loaded measuring instruments.

With reference now to FIGURE 4, a modified form of the invention is illustrated. As shown, the pressure sensitive elements here comprise a plurality of bellows members 80—83 arranged in paired relation. These bellows each are subject interiorly to one of four control pressures $P_1-P_4$ or, alternatively, one or more of the bellows may instead be evacuated as will later be explained.

A fulcrum member 85 mounted for limited angular movement about a pivot 87 constitutes the variable mechanical advantage means for interconnecting the pressure derived forces produced by the several bellows. The necessary connections between the fulcrum member 85 and the bellows are made by a pair of connecting link members 89 and 91, each of which is pivotally connected at one end to the fulcrum member as at 93 and 94, respectively, and similarly connected at its other end to one of two plates 96 and 97, respectively, carried between the pairs of bellows assemblies.

As in the case of FIGURE 1, output indication or control may be effected either by sensing linear movement of the pressure responsive elements or by sensing angular movement of the fulcrum member, by any suitable position sensor device. As actually shown, the position sensor in FIGURE 4 comprises a linear transducer 98 of conventional differential transformer or autotransformer type, with the transducer pivotally mounted to a fixed support as at 99 and with its core connected to an actuating rod 100 pivotally connected as at 101 to the fulcrum member 85 of the rocker assembly. The electrical output signal produced by transducer 98 may be connected to any suitable indicating or control instrument (not shown).

In the arrangement shown, the pressures $P_1-P_4$ should be so related that $P_1$ is larger than $P_2$ and $P_3$ larger than $P_4$, thus assuring that the net forces on connecting link members 89 and 91 are inwardly directed. Then the moment arms for the two opposed forces will be self-adjusting to maintain balance between the forces in substantially the same manner as previously described in reference to FIGURES 1 and 2.

Thus, if the force derived from the pressure difference $P_1-P_2$ at bellows 80 and 81 acts through a moment arm $h_1$ when the parts are in an equilibrium position shown in solid lines in FIGURE 4, and this pressure difference should increase and cause force unbalance with consequent counter-clockwise rotation of the fulcrum member 85 to the right hand dotted line position, the moment arm through which this force acts would then be shortened to $h'_1$. At the same time, the moment arm through which the other bellows assembly 82—83 acts would be correspondingly lengthened, from $h_2$ to $h'_2$, to restore force balance at the new equilibrium position.

In the instrument of FIGURE 4, the force moments of the left and right hand bellows assemblies are as follows:

$$FM_1 = Ar_1(P_2-P_1) \sin \theta_1$$

$$FM_2 = Ar_2(P_4-P_3) \sin \theta_2$$

where A is the effective area of each bellows. These relations assume that the link members 89 and 91 are of sufficient length that the angles $\theta_1$ and $\theta_2$ do not change significantly on movement of the rocker assembly.

Equating these force moment expressions, the pressure ratio at balance is given by the relation:

$$\frac{P_2-P_1}{P_4-P_3} = \frac{r_2 \sin \theta_2}{r_1 \sin \theta_1}$$

It will be apparent that if one or more of the bellows is evacuated and sealed, the foregoing relationship is considerably simplified. If two of the bellows (80—82) are evacuated, for example, the device then measures the ratio of pressures in the two remaining bellows 81 and 83 directly. Similarly, one or more of the bellows could be supplied with any other suitable reference pressure, as from the reference pressure generator 22 of FIGURE 1 for example.

It will also be appreciated that connection of the bellows links 89 and 91 need not necessarily be to spaced points on the fulcrum member 85 as illustrated; both may be connected to the same point if preferred. When this is done, $r_1$ then is equal to $r_2$ and the expression for pressure ratio reduces to:

$$\frac{P_2-P_1}{P_4-P_3} = \frac{\sin \theta_2}{\sin \theta_3}$$

Diaphragms and bellows assemblies as shown in FIGURE 4 lend themselves better to use in "on-point" and "off-point" control apparatus than to indication type instruments which must be operative over a relatively wide range of pressure ratio variation. This follows because bellows and diaphragms are inherently spring type devices and therefore introduce a spring constant into the measurement, and further because of temperature sensitivity and other incidental effects. In "on-point" and "off-point" type systems, however, where the spring neutral point of the bellows is made coincident with the equilibrium pressure ratio position of the rocker assembly, the bellows spring constant will not adversely affect the calibration of the instrument or otherwise impair its operation except possibly by some reduction of sensitivity due to the added centering force produced by the bellows unit.

As previously mentioned, the equations given above for pressure ratio assume that the link members 89 and 91 are of sufficient length that the angles $\theta_1$ and $\theta_2$ do not change significantly on movement of the rocker assembly. In an "on-point" and "off-point" type instrument this assumption is entirely justified, but if the instrument is to be of indicating type and operative over a wider range of pressure ratios then it would be desirable to introduce a correction factor for link angle in generally the same fashion as was explained in connection with the angles $\phi$ in FIGURE 2.

While only certain perferred embodiments of the invention have been described and illustrated by way of example in the foregoing, many modifications will occur to those skilled in the art and it therefore should be understood that the appended claims are intended to cover all such modifications as fall within the true spirit and scope of the invention.

What I claim as new and desire to secure by Letters Patent of the United States is:

1. A pressure ratio sensor apparatus comprising, in combination, a plurality of pressure responsive elements responsive to three or more pressures at least two of which are pressures entering into the ratio to be sensed, means supplied at one of said pressures and operative to produce a reference pressure related to said one pressure, at least one of said pressure responsive elements being responsive to said reference pressure, a rocker assembly including a fulcrum member pivotally mounted for angular movement about a fixed axis, said rocker assembly further including means coupling said pressure responsive elements to said fulcrum member with the forces generated by said pressure responsive elements connected in opposed relation through moment arms such that upon force moment unbalance the pressure responsive elements directly effect angular movement of said fulcrum member with consequent change in relative lengths of the moment arms in a direction and to an extent such as to restore force moment balance substantially wholly by change of moment arm length, and means for sensing movement of said rocker assembly.

2. A pressure ratio sensor comprising, in combination, a plurality of pressure responsive elements each including a cylinder and piston free for relative movement and responsive to applied fluid pressure to produce a pressure derived force, a rocker assembly including a fulcrum member pivotally mounted for angular movement about a fixed axis and further including means coupling said pressure responsive elements to said fulcrum member at points thereon spaced from said axis so as to provide, for said pressure derived forces, moment arms of effective length proportioned to enable force balance at a predetermined value of pressure ratio, said pressure responsive elements being directly operative in response to force unbalance due to pressure ratio departure from said predetermined value to move said rocker assembly and fulcrum member to cause consequent change in relative lengths of the force moment arms in a manner to restore force balance substantially wholly by change in moment arm length, and means for sensing position of said rocker assembly.

3. A pressure ratio sensor as defined in claim 2 wherein said piston has its peripheral surface arcuate in section so as to afford no more than line contact between the piston and cylinder.

4. A pressure ratio sensor as defined in claim 3 wherein said piston is undersize with respect to said cylinder so as to enable leakage flow therebetween.

5. A pressure ratio sensor comprising, in combination, a plurality of pressure responsive elements each including a cylinder and piston free for relative movement and responsive to applied fluid pressure to produce a pressure derived force, a rocker assembly including a fulcrum member pivotally mounted for angular movement about a fixed axis and further including means coupling said pressure responsive elements to said fulcrum member at points thereon spaced radially from said axis on radii spaced angularly from each other so as to provide, for said pressure derived forces, moment arms of effective length proportioned to enable force balance at predetermined value of pressure ratio, said fulcrum member being self-adjusting in response to force unbalance due to pressure ratio departure from said predetermined value to change the relative lengths of the force moment arms in a direction and to an extent such as to restore force balance substantially wholly by change in moment arm length, and means for sensing position of said rocker assembly.

6. A pressure ratio sensor comprising, in combination, a plurality of pressure responsive elements each including a cylinder and piston free for relative movement and responsive to applied fluid pressure to produce a pressure derived force, a rocker assembly including a fulcrum member pivotally mounted for angular movement about a fixed axis and further including connecting rod members coupling said pressure responsive elements to said fulcrum member at points thereon spaced radially from said axis on radii spaced angularly from each other so as to provide, for said pressure derived forces, moment arms of effective length proportioned to enable force balance at a predetermined value of pressure ratio and predetermined angular position of said rocker assembly such that said connecting rod members are collinear with each other, said fulcrum member being self-adjusting in response to force unbalance due to pressure ratio departure from said predetermined value to change the relative lengths of the force moment arms in a direction and to an extent such as to restore force balance substantially wholly by change of moment arm length, and means for sensing position of said rocker assembly.

References Cited in the file of this patent

UNITED STATES PATENTS

| | | |
|---|---|---|
| 1,007,178 | Billings | Oct. 31, 1911 |
| 1,257,964 | Bailey | Mar. 5, 1918 |
| 1,718,673 | Wettstein | June 25, 1929 |
| 1,943,267 | Giers | Jan. 9, 1934 |
| 2,710,137 | Arnouil | June 7, 1955 |
| 2,853,880 | Redding | Sept. 30, 1958 |
| 2,937,526 | Roche | May 24, 1960 |
| 2,937,528 | Ketchum | May 24, 1960 |